US 6,609,583 B2

(12) United States Patent
Schillaci et al.

(10) Patent No.: US 6,609,583 B2
(45) Date of Patent: Aug. 26, 2003

(54) VEHICLE HOOD SAFETY PROP

(75) Inventors: Nicholas Schillaci, Ancaster (CA); Ilija Tunjic, Hamilton (CA)

(73) Assignee: Dofasco Inc., Hamilton (CA)

( * ) Notice: Subject to any disclaimer, the term of this patent is extended or adjusted under 35 U.S.C. 154(b) by 0 days.

(21) Appl. No.: 09/878,939

(22) Filed: Jun. 13, 2001

(65) Prior Publication Data

US 2002/0000022 A1 Jan. 3, 2002

Related U.S. Application Data

(60) Provisional application No. 60/211,484, filed on Jun. 14, 2000.

(51) Int. Cl.⁷ .......................... B62D 25/10; E05C 17/44
(52) U.S. Cl. ..................... 180/69.21; 292/338; 248/352
(58) Field of Search ............................ 180/69.2, 69.21, 180/69.22, 69.23; 292/262, 266, 269, 273, 338, DIG. 14; 16/324, 326, 331, 332; 248/351, 352

(56) References Cited

U.S. PATENT DOCUMENTS

| | | | | |
|---|---|---|---|---|
| 1,757,021 A | * | 5/1930 | Remondino ............... 180/69.21 |
| 4,012,807 A | * | 3/1977 | Kern ....................... 180/69.21 |
| 4,206,944 A | | 6/1980 | Kumagai et al. |
| 4,436,330 A | | 3/1984 | Mayo et al. |
| 4,482,023 A | * | 11/1984 | Dziedzic et al. .......... 180/69.21 |
| 4,629,146 A | | 12/1986 | Lymons |
| 5,306,053 A | | 4/1994 | Gurusami et al. |
| 5,411,109 A | | 5/1995 | Orns |
| 5,435,406 A | * | 7/1995 | Gaffoglio et al. ......... 180/69.21 |
| 5,577,452 A | * | 11/1996 | Yindra ..................... 180/69.21 |
| 5,611,584 A | | 3/1997 | Giese et al. |
| 5,806,619 A | * | 9/1998 | Kleinhoffer et al. ...... 180/69.21 |
| 6,213,235 B1 | * | 4/2001 | Elhardt et al. ........... 180/69.21 |
| 6,217,108 B1 | * | 4/2001 | Sasaki ..................... 180/69.21 |
| 6,371,231 B1 | * | 4/2002 | Nushii et al. ............ 180/69.21 |
| 6,394,211 B1 | * | 5/2002 | Palenchar et al. ........ 180/69.21 |
| 6,415,882 B1 | * | 7/2002 | Schuster et al. .......... 180/69.21 |
| 6,453,511 B2 | * | 9/2002 | Sato ....................... 180/69.21 |

FOREIGN PATENT DOCUMENTS

| | | | |
|---|---|---|---|
| JP | 06219330 | | 9/1994 |
| JP | 055170 A | * | 2/2001 |

* cited by examiner

*Primary Examiner*—Brian L. Johnson
*Assistant Examiner*—Jeffrey Restifo
(74) *Attorney, Agent, or Firm*—Ingrid E. Schmidt

(57) ABSTRACT

A compact, closure panel prop assembly incorporating a spring activated locking pin which automatically engages a closure panel prop when the closure panel is elevated to a predetermined height. The prop assembly is designed to work in unison with a closure panel hinge, which is fixed to the closure panel and associated body in such a manner that it allows for the opening of the closure panel covering an opening in the body.

39 Claims, 13 Drawing Sheets

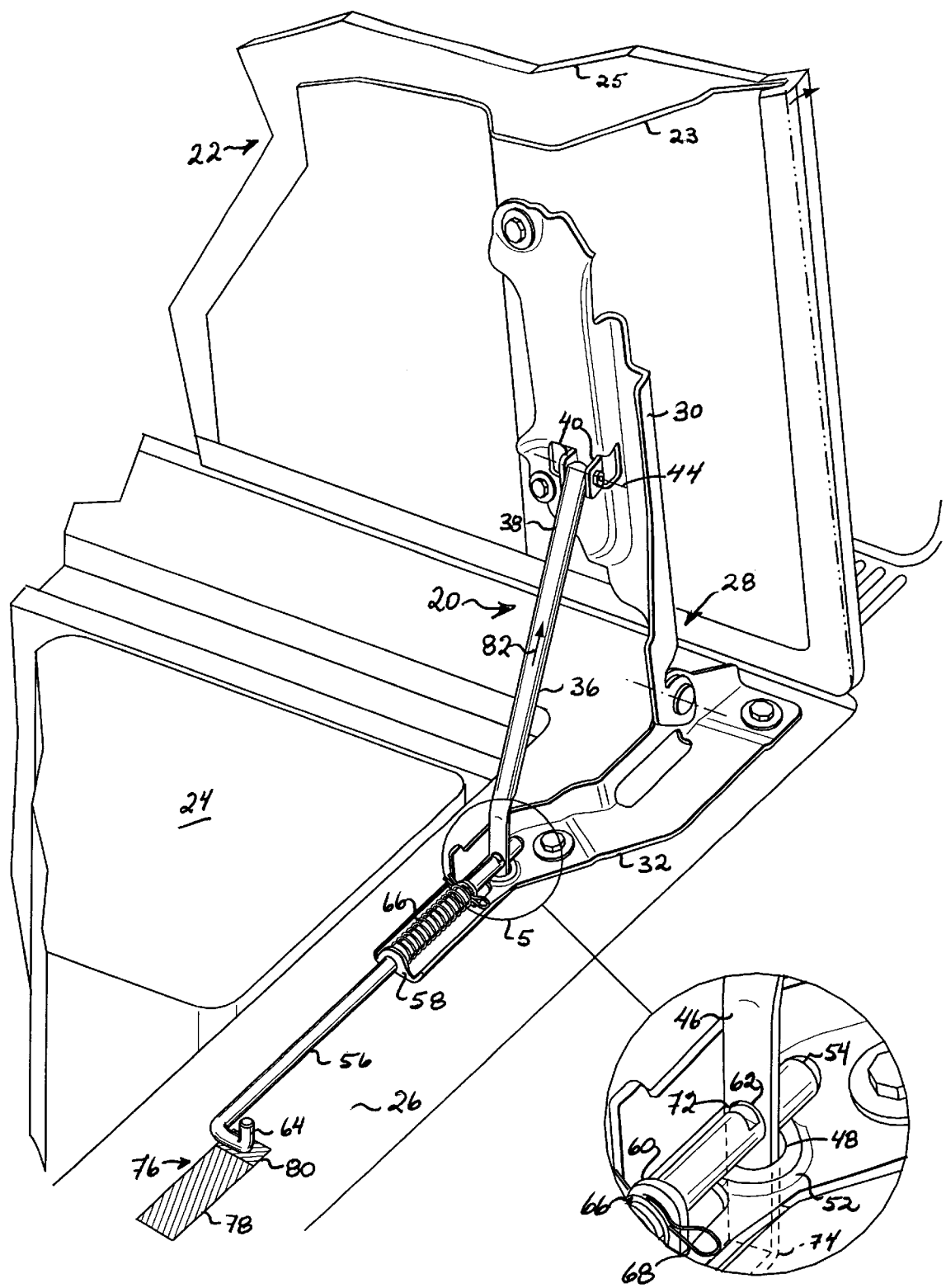
FIG. 4      FIG. 5

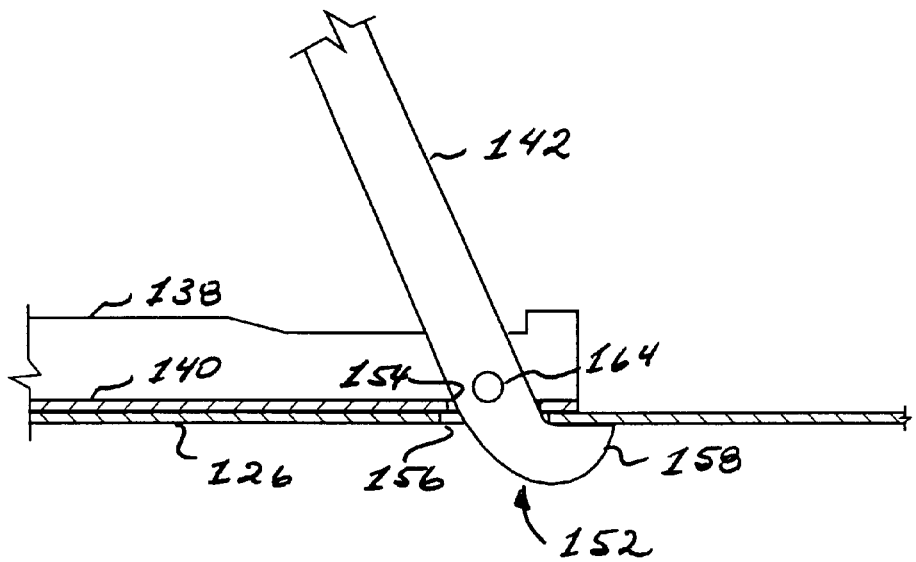
FIG. 16a
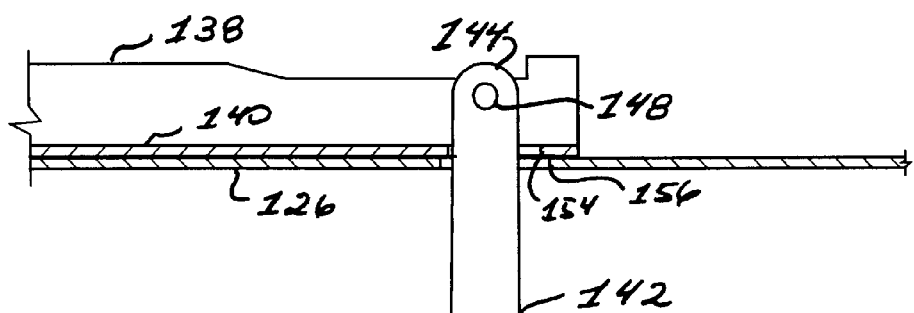
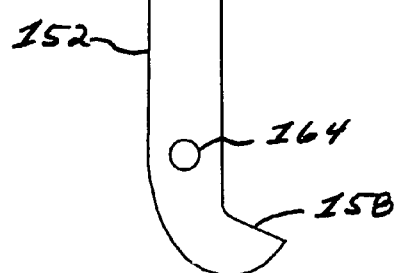
FIG. 16b

VEHICLE HOOD SAFETY PROP

FIELD OF THE INVENTION

This invention relates to props used for supporting a closure panel in an extended position removed from an opening and in particular to closure panels such as lids, or hoods for closing an opening formed in a vehicle body such as a trunk or engine compartment. It will however be understood that the invention will likewise find application for propping other types of closure panels, for example hinged closure panels for storage containers.

BACKGROUND OF THE INVENTION

It is common practice to provide a closure panel such as a hood for closing a vehicle engine compartment, the hood being hinged to the vehicle body for movement between an extended position removed from the engine compartment and a release position where the hood closes the engine compartment to protect it from weather, dirt and debris. In the extended position, the hood provides access to the engine compartment for maintenance and inspection of the engine compartment and it is therefore required to provide means for supporting the hood in such an extended position. Commonly, a prop is fixed at one end to the vehicle body adjacent to the engine compartment and has a free end which is selectively engaged with a portion of the vehicle hood, such as a receiving aperture.

One problem which is associated with vehicle hoods is that the operator must have one hand free to raise and support the hood in the extended position until the prop is engaged in the receiving aperture by another hand. Another problem which arises is that the prop is not positively located in the hood and if it becomes disengaged by a sudden movement of the vehicle, vibration or wind, the hood will suddenly be released and close the compartment, and perhaps injure an operator.

One of the objects of this invention is to provide a prop assembly which will alleviate these problems and advantageously, may also be less expensive to manufacture than conventional hood props and be lighter, thereby improving the combustion fuel efficiency for the vehicle.

SUMMARY OF THE INVENTION

This invention is a compact, closure panel prop assembly incorporating a spring activated locking pin which automatically engages a closure panel prop when the closure panel is elevated to a predetermined height. The prop assembly is designed to work in unison with a closure panel hinge, which is fixed to the closure panel and associated body in such a manner that it allows for the opening of the closure panel covering an opening in a body.

The action of the prop assembly is such that when the closure panel is opened, the prop, pivotally attached at an upper end to the hinge is withdrawn from an aperture provided in a bottom of the hinge and extending through the upper surface of a body cavity. The spring loading locking pin is released upon encountering a passage provided in the prop.

The spring activated pin automatically enters the passage in the support prop, without any assistance from the operator when the closure panel is opened and prevents the closure panel from returning to a closed position. When the closure panel is opened again, the pin will automatically re-engage the passage provided in the support prop, thereby preventing the closure panel from closing.

BRIEF DESCRIPTION OF THE DRAWINGS

FIG. 4 is a similar view to FIG. 2 showing a locking pin engaging a passage provided in a prop;

FIG. 5 is a detail view of circled area 5 in FIG. 4;

FIG. 16a is a partly sectional view showing the prop in an extended configuration; and FIG. 16b is a similar view to FIG. 16a showing the prop in a release, stored configuration inside a body cavity.

DETAILED DESCRIPTION WITH REFERENCE TO THE DRAWINGS

Figure 1:
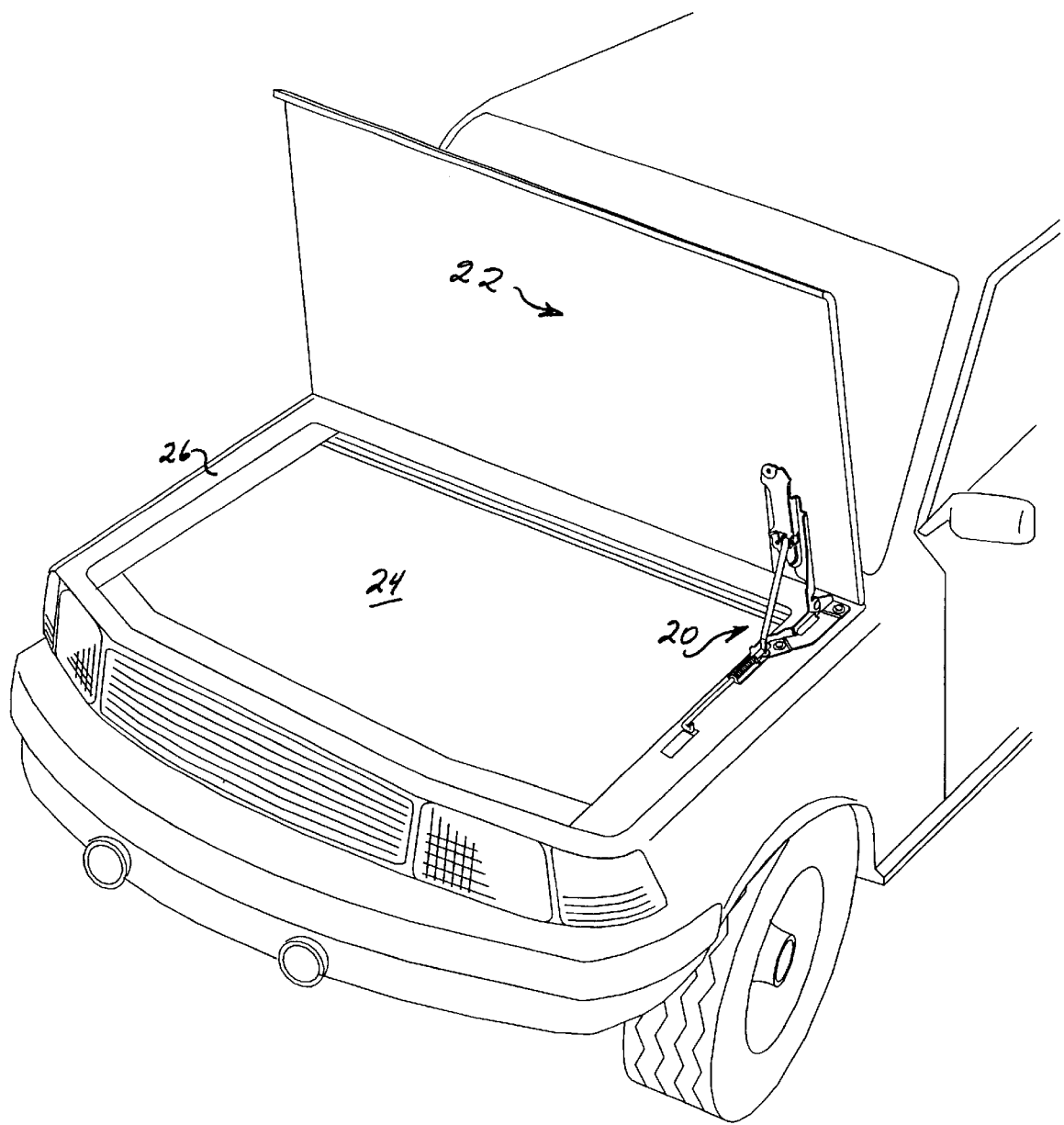
FIG. 1 is a schematic perspective view showing a prop assembly in accordance with a first embodiment of the invention associated with a vehicle hood and vehicle body.

A first embodiment of the invention will be described with reference to FIGS. 1 to 10 in which a prop assembly generally indicated by reference numeral 20 is shown supporting a closure panel in the form of a hood assembly 22 having an inner panel 23 and an outer panel 25 for closing an opening defined by an engine compartment 24 formed in a vehicle body 26. Conveniently, the prop assembly 20 is associated with a hood hinge assembly 28 (most clearly shown in FIG. 2) having a first hinge bracket 30 coupled to the hood assembly 22 and second hinge bracket 32 secured to the front fender support rail of the vehicle body 26, and typically located adjacent to a back corner of the engine compartment 24. As will be seen in FIG. 2, the first hinged bracket 30 is bolted to the hood inner panel 23 while the second hinge bracket 32 is secured to the vehicle body 26 with bolts. As is common in the art, the hood hinge assembly 28 allows the hood assembly 22 to move between an extended position removed from the engine compartment 24 and a release position where it closes the engine compartment.

Figures 2, 3:
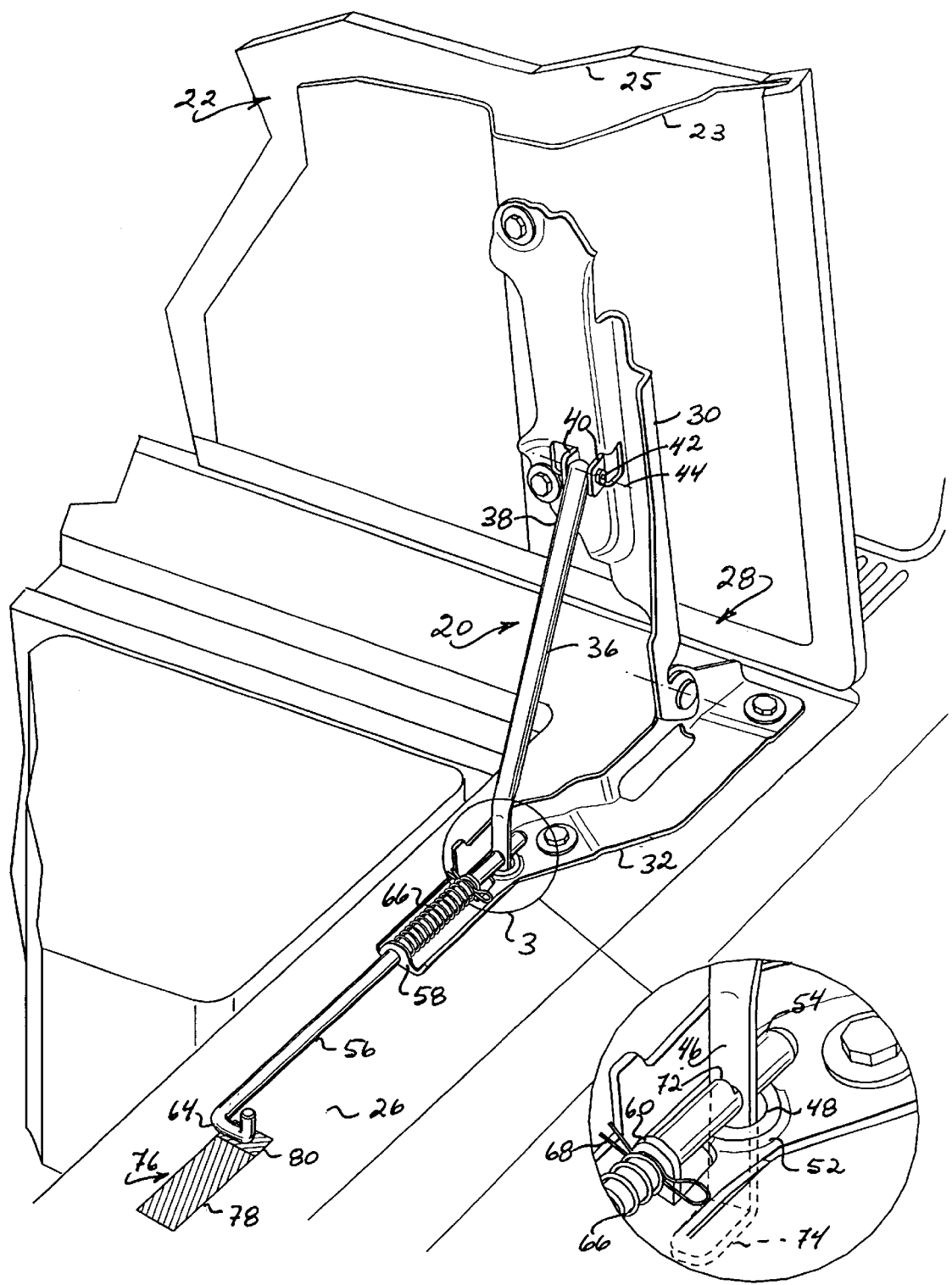
FIG. 2 is a similar view to FIG. 1 drawn to a larger scale.
FIG. 3 is a detail view of circled area 3 in FIG. 2.
Figures 6, 7:
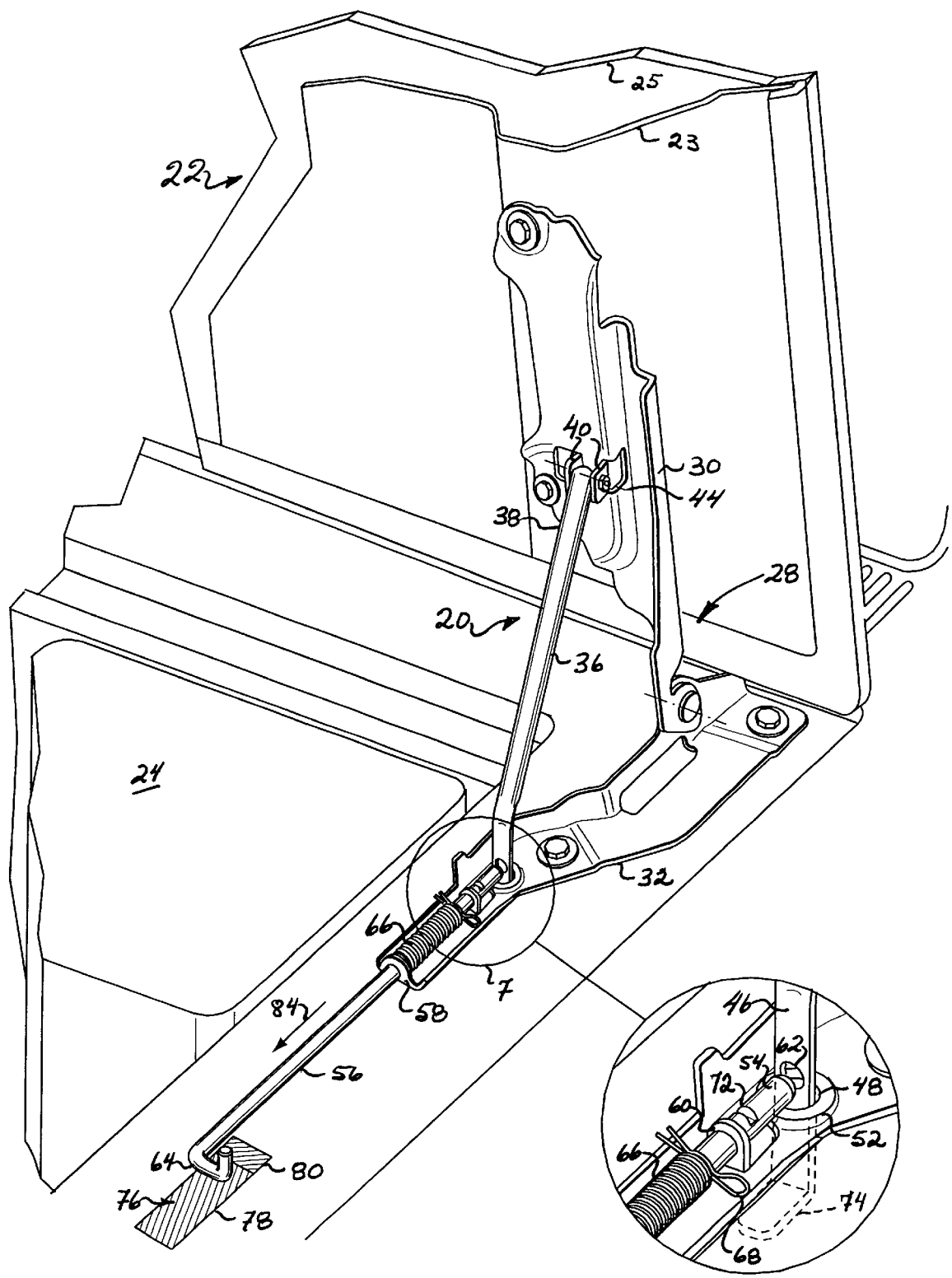
FIG. 6 is a similar view to FIG. 2 showing a locking pin being withdrawn from a passage provided in a prop.
FIG. 7 is a detail view of circled area 7 in FIG. 6.
Figure 8:
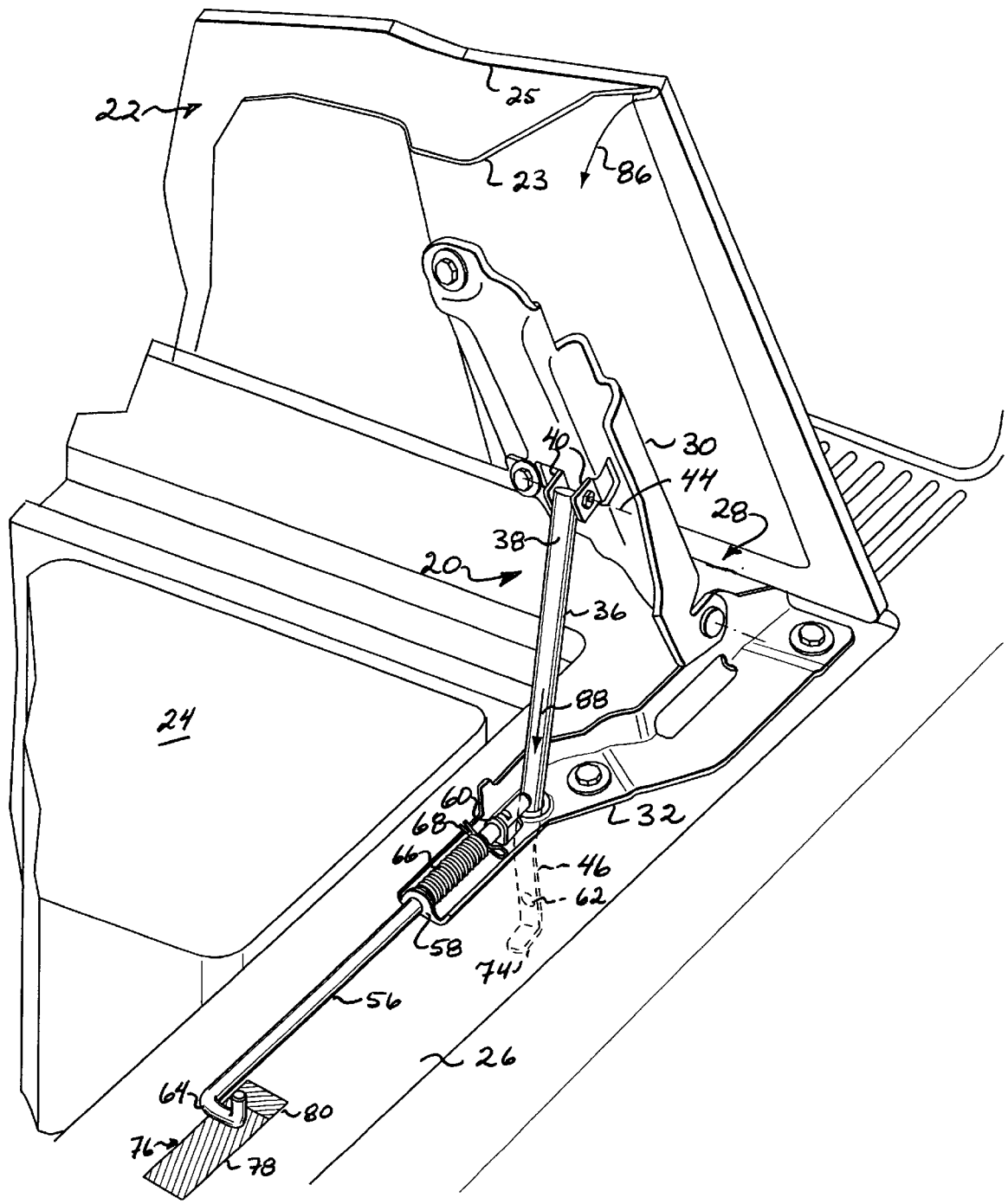
FIG. 8 is a similar view to FIG. 2 showing a locking pin engaging a prop during lowering of a closure panel.

In order to support the hood assembly 22 in the extended position drawn in FIG. 2, there is provided a prop assembly.

In accordance with the invention, the prop assembly 20 has a rigid elongated prop 36 which, in this embodiment, is tubular and has a hinged end 38 coupled to the first hinge bracket 30 mounted to the hood assembly 22. In the embodiment illustrated, a pair of flanges 40 are cut out from the first hinge bracket 30 so as to lie on opposite sides of the hinged end 38 and through which a bolt 42 is received for pivotal movement of the prop 36 about axis 44.

Figure 9:
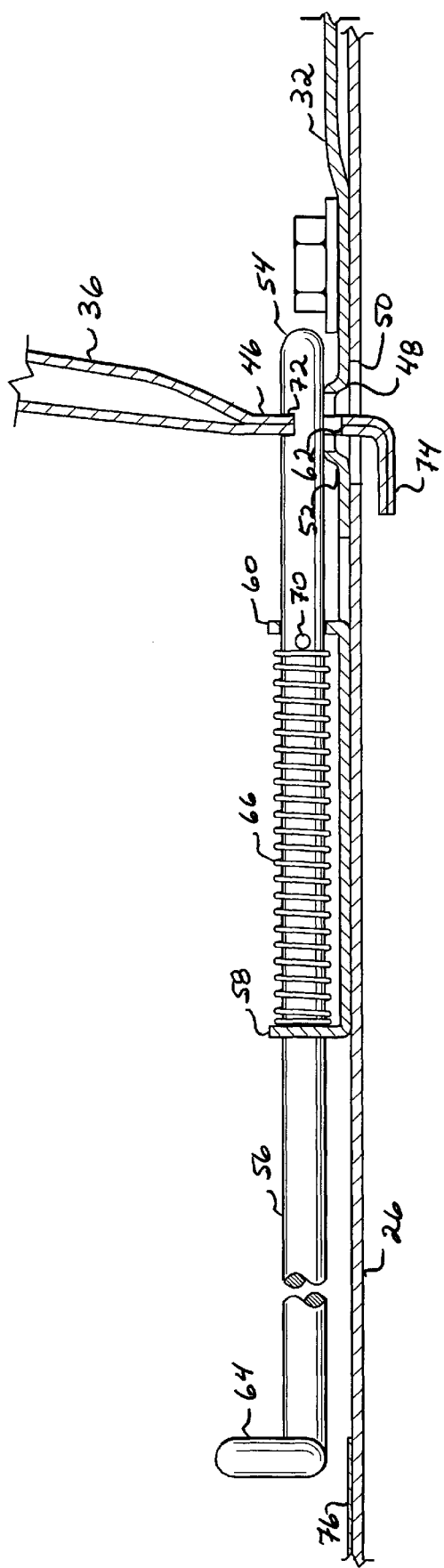
FIG. 9 is a partly sectioned side view (drawn to a larger scale) of the prop assembly of FIG. 1 showing a closure panel locked in an open position.
Figure 10:
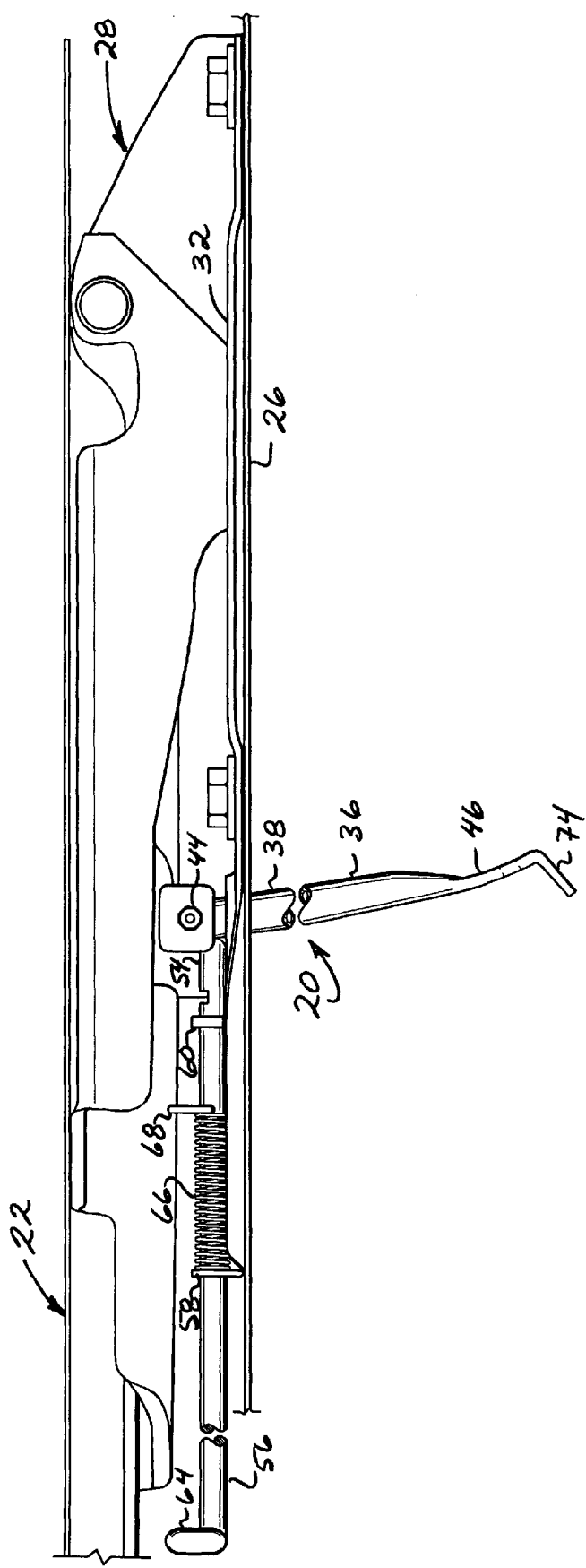
FIG. 10 is a side elevation view of the prop assembly in accordance with the invention showing the closure panel in a closed position.

The prop 36 has a free end 46 (shown in the detail view of FIG. 3 and also FIGS. 8 to 10) which extends through an aperture 48 formed in the second hinge bracket 32 and cooperating with a second aperture 50 formed in the vehicle body 26 as shown more clearly in FIG. 9.

It will be seen that the walls of the tubular prop 36 are collapsed together at the free end 46 and that the second hinge bracket 32 is deformed to form a boss 52 surrounding the first aperture 48 for a purpose which will be explained further below with reference to FIG. 9.

The prop assembly 20 is completed by a spring biased locking pin 54 biased into engagement with the prop 36. As will be seen in FIGS. 2 and 3, a rigid rod 56 is slidingly mounted to the vehicle body 26 between a pair of spaced mounting flanges 58, 60 apertured to slidingly receive the rod 56 therethrough. A first end mounting flange 58 remote from the prop 36 is formed by bending an end portion of the second hinge bracket 32 while the second mounting flange 60 proximate to the prop 36 is formed by cutting out a tab from the body of the second hinge bracket 32. Additional support for the rod 56 is provided at the proximate end by the aforementioned boss 52 when the rod is extended into a locking position.

The locking pin 54 is defined by the proximate end of the rod 56 and is adapted to be slidingly received through a passage defined by a hole 62 formed in the free end 46 of the prop 36 as illustrated by FIGS. 2 and 9.

A retractor for withdrawing the locking pin 54 away from the prop 36 is defined by a bent up portion of the rod 56 at the trailing end as indicated by reference numeral 64. A coiled spring 66 is slidingly disposed on the rod 56 between the end mounting flange 58 and a retainer in the form of a cotter pin 68 slidingly received in an aperture 70 (FIG. 9) formed in the rod 56.

A detent or notch 72 (see FIG. 5) is cut into an outer surface of the proximal end of the rod 56 for latching engagement with the free end 46 of the prop 36, as will be explained.

Finally, it will be seen from FIG. 9 that the free end 46 of the prop 36 has a transverse bent portion defining a stop 74 which is spaced from the hole 62 and is adapted to engage the vehicle body 26 when the hood assembly 22 is in a maximum open position, as will be explained.

The operation of the prop assembly 20 will now be described with reference being made to FIGS. 2 to 8 and 10. In use, the hood assembly 22 would normally be in a closed position as drawn in FIG. 10 and disposed generally horizontally. The prop 36 would extend through the apertures 48, 50 into a vehicle body cavity disposed beneath a front fender support rail for the vehicle and may covered to prevent rattling inside the fender. In this stored configuration, the locking pin 54 is biased by the coil spring 66 into engagement with the prop 36 at the operatively upper, hinged end 38. As the hood assembly 22 is raised, the locking pin 54 aligned by the mounting flanges 58, 60 is biased by the coil spring 66 to maintain contact with the prop 36 as it emerges from the apertures 48, 50. Upon reaching the hole 62 in the free end 46 of the prop 36, the locking pin 54 penetrates through the hole 62 to extend beyond the prop 36 (as shown in FIG. 5) and continued movement of the rod 56 is arrested by the notch 72 in the locking pin 54 and which locates against the free end 46 of the prop as illustrated in FIG. 9 and also FIG. 3.

It will be understood that the proximal mounting flange 60 will also arrest further movement of the rod 56 when the rod reaches a position where the cotter pin 68 bears against the flange 60.

While such engagement of the free end 46 of the prop into the notch 72 will produce an audible click thereby alerting the operator that the hood assembly 22 has safely been latched into an extended position removed from the engine compartment 24, the invention also provides a visual indicator in the form of an adhesively secured marker 76 fastened to the vehicle body 26 and having two adjacent zones 78, 80 of contrasting color and disposed proximate to the retractor 64. The proximate zone 80 may, for example, be colored red while the distal portion may be colored green so that when the red zone 80 is covered by the retractor 64 only the green zone 78 is exposed thereby indicating that the prop assembly is in a safe extended position whereas when any portion of the red proximal zone 80 is exposed, an operator will be alerted that the locking pin 54 is not safely engaged in the prop 36.

It will also be appreciated that the hood assembly 22 is further prevented from continued pivotal movement away from the engine compartment 24 by the stop 74 at the lower free end of the prop 36 which will engage the operatively lower surface of the vehicle body 26.

When it is desired to lower the hood assembly 22, an operator must first raise the hood a short distance commensurate with the separation between the stop 74 and the vehicle body 26 (see FIG. 9) in order to disengage the free end 46 from the notch 72 as indicated by directional arrow 82 in FIG. 4. In this extended position, the locking pin 54 may be withdrawn through the aperture 62 as indicated by directional arrow 84 in FIG. 6 by manual operation of the retractor 64, thereby exposing the red zone 80 of the marker 76. Continued movement of the hood assembly 22 toward the vehicle body 26 as indicated by directional arrow 86 in FIG. 8 results in downward movement of the prop 36 as indicated by directional arrow 88 with locking pin 54 continuously biased by the coil spring 66 into an engagement with the prop 36 so that when it reaches the stored position of FIG. 10 it is ready to be re-deployed upon reopening of the hood assembly 22.

Figure 11:
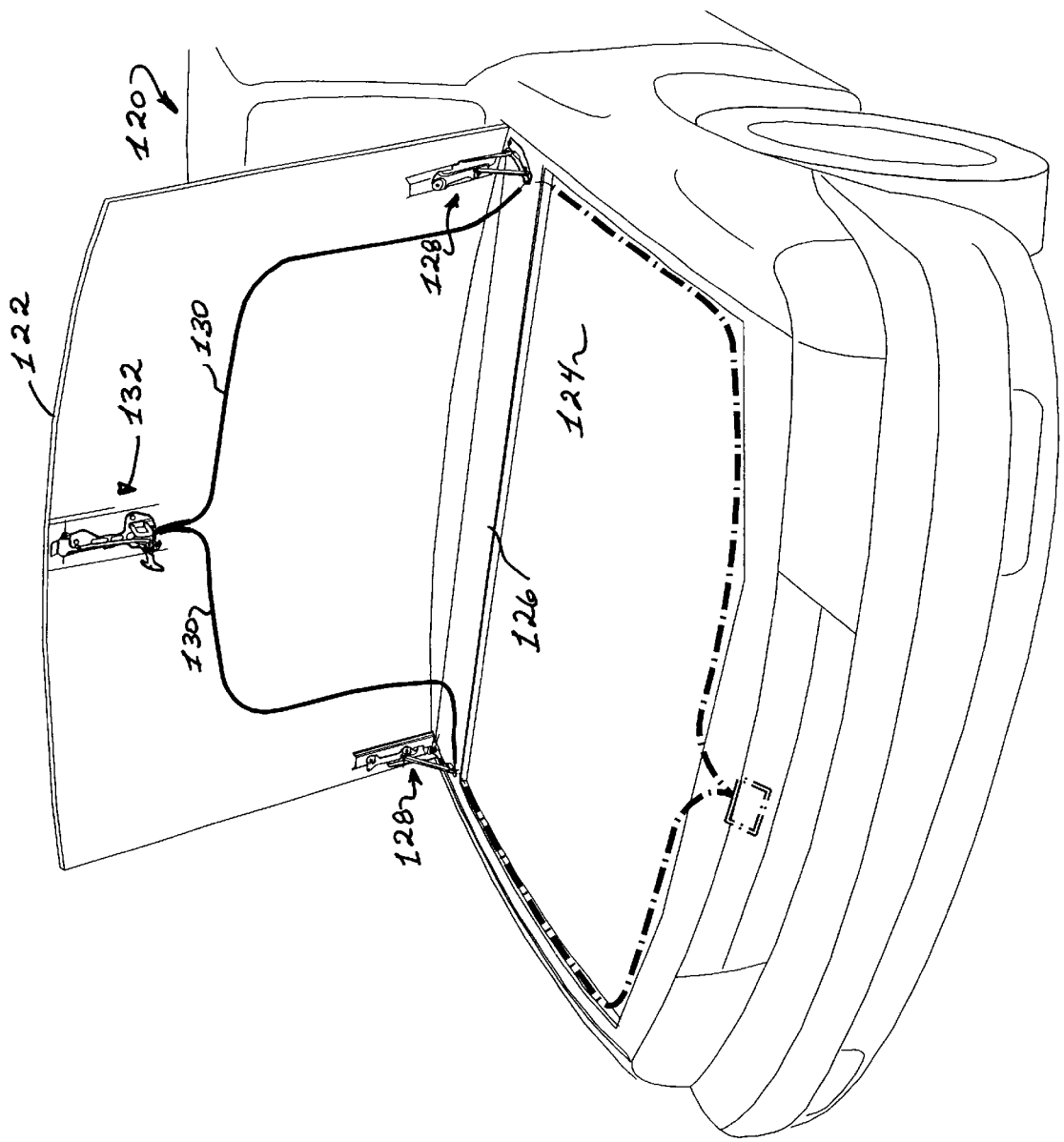
FIG. 11 is a schematic perspective view showing a prop assembly in accordance with a second embodiment of the invention associated with a vehicle hood and vehicle body.

A second embodiment of the invention will now be described with reference to the remaining FIGS. 11–16 in which the locking pin is biased into engagement with a hood prop by means of a leaf spring retracted by means of a cable assembly which conveniently is actuated by a vehicle hood latch. In FIG. 11, there is illustrated a vehicle generally indicated by reference numeral 120 having a hood assembly 122 in an extended position removed from an engine compartment 124 defining an opening in the vehicle body 126. The prop assembly according to the invention is generally indicated by reference numeral 128 and is intended to be used with a larger vehicle 120 having a heavier hood assembly 122 and is therefore provided in pairs on respective sides of the vehicle 120. Each prop assembly 128 is coupled by a respective cable retractor 130 having a common actuator associated with a hood latch assembly 132.

Only a single prop assembly 128 will be described with reference to FIGS. 12 to 14, it being understood that a similar prop assembly is disposed on the opposite side of the vehicle.

The hood assembly 122 is coupled to the vehicle body 126 by means of a hinge assembly generally indicated by reference numeral 134 and comprising a hinge pin 136 coupling a first hinge bracket 138 mounted to the hood assembly 122 and a second hinge bracket 140 coupled to the vehicle body 126.

The prop assembly 128 has an elongated prop 142 formed from sheet steel into a U-shape cross-section. The prop 142 is coupled to the first hinge bracket 138 at a hinged end 144 receiving an upturned flange 146 formed from the first hinge bracket 138 by a rivet 148 for pivotal movement about pivot axis 150. The prop 142 has a free end 152 remote from the hinged end 144 which is slidingly received through respective apertures 154, 156 formed in the second hinge bracket 140 and the vehicle body 126 (see FIGS. 16a, 16b). The free end 152 has a stop 158 which, as described in the first embodiment of FIGS. 1 to 10, is adapted to engage the operatively lower surface of the vehicle body 126 so as to limit vertical movement of the hood assembly 122 away from the engine compartment 124.

Figure 12:
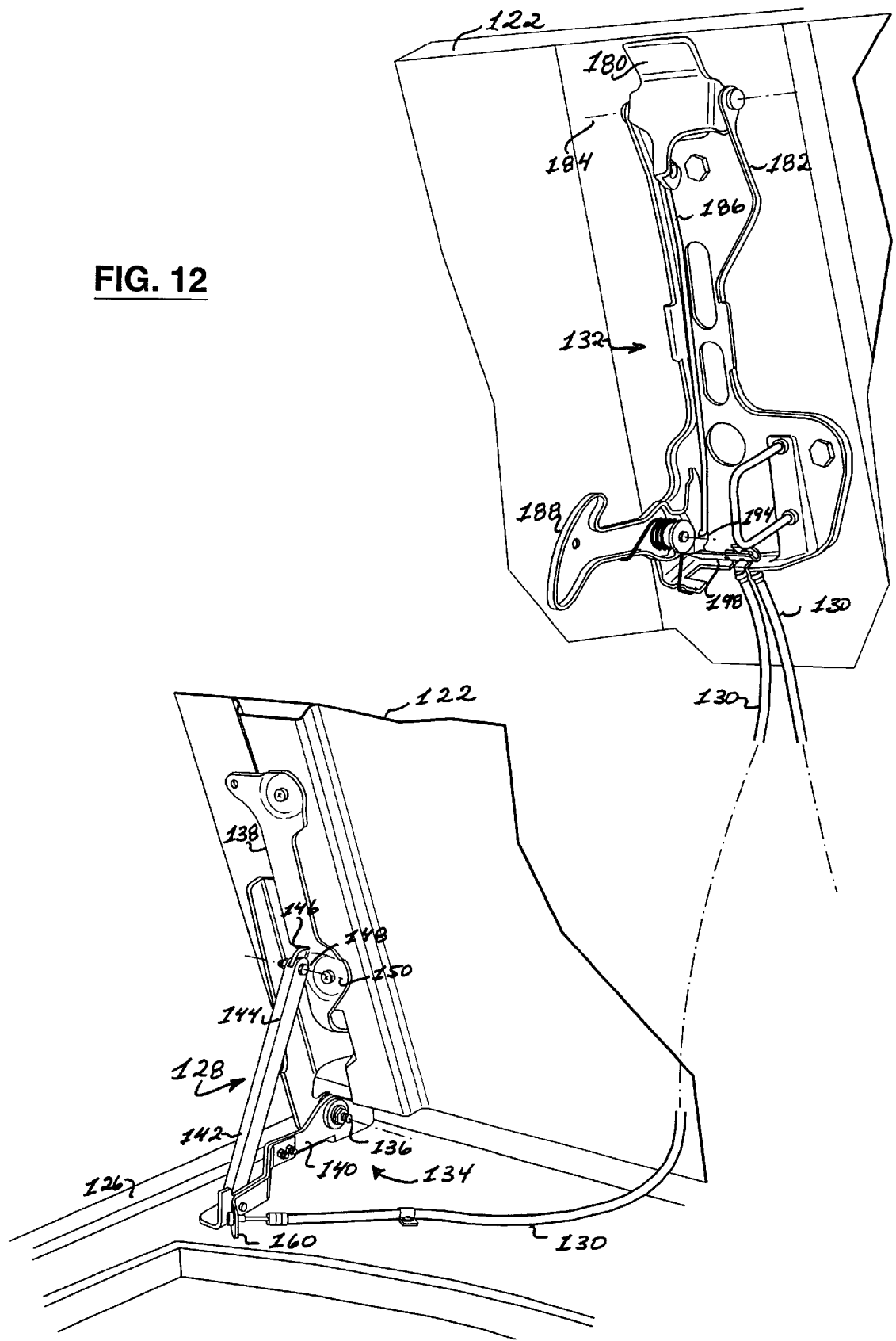
FIG. 12 is a similar view to FIG. 11 drawn to a larger scale.
Figure 13:
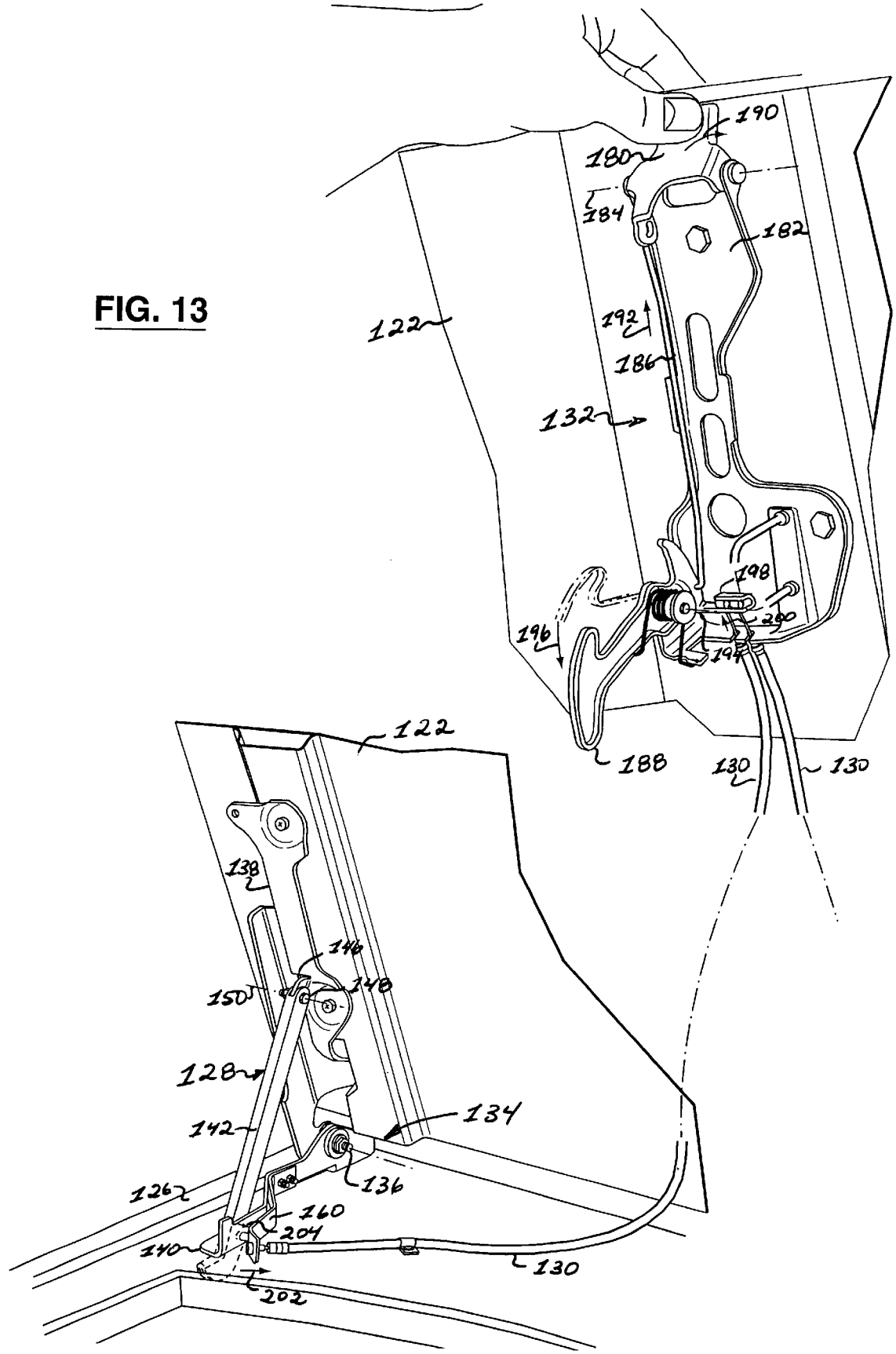
FIG. 13 is a similar view to FIG. 12 showing a hood latch assembly being actuated to tension a retractor for prop assembly.
Figure 14:
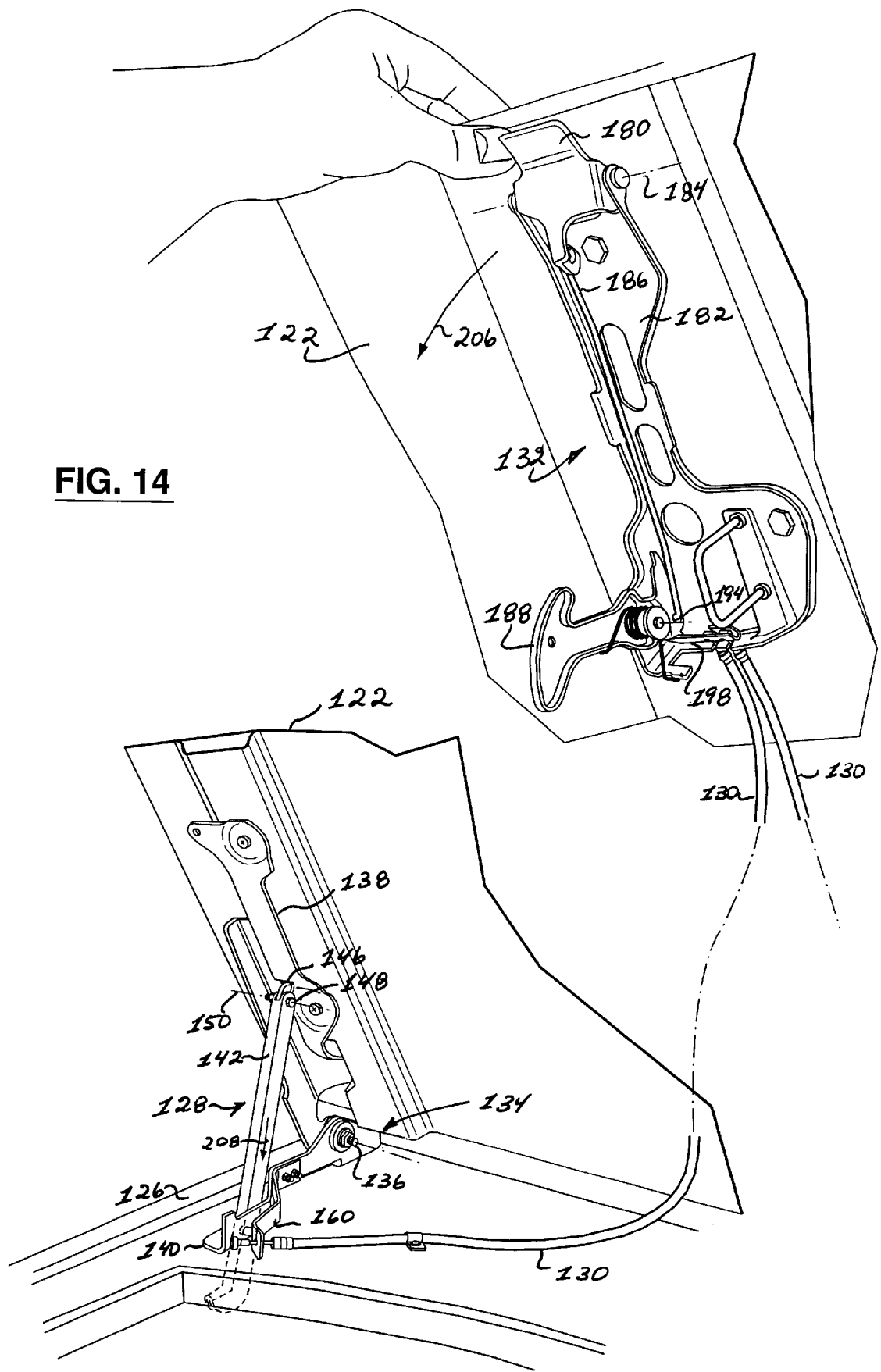
FIG. 14 is a similar view to FIG. 12 showing the hood latch assembly in a release position to close a vehicle hood.
Figure 15A:
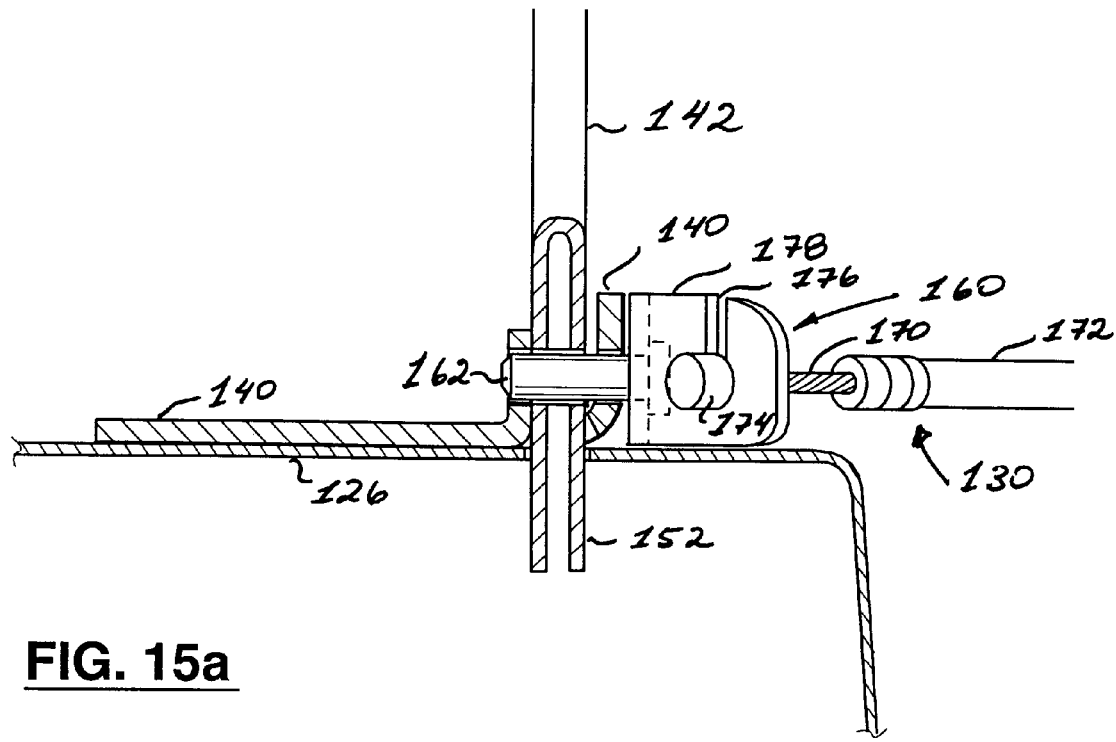
FIG. 15a is a partly sectional view showing a cable retractor and leaf spring forming part of the prop assembly showing a locking pin engaged in a prop.
Figure 15B:
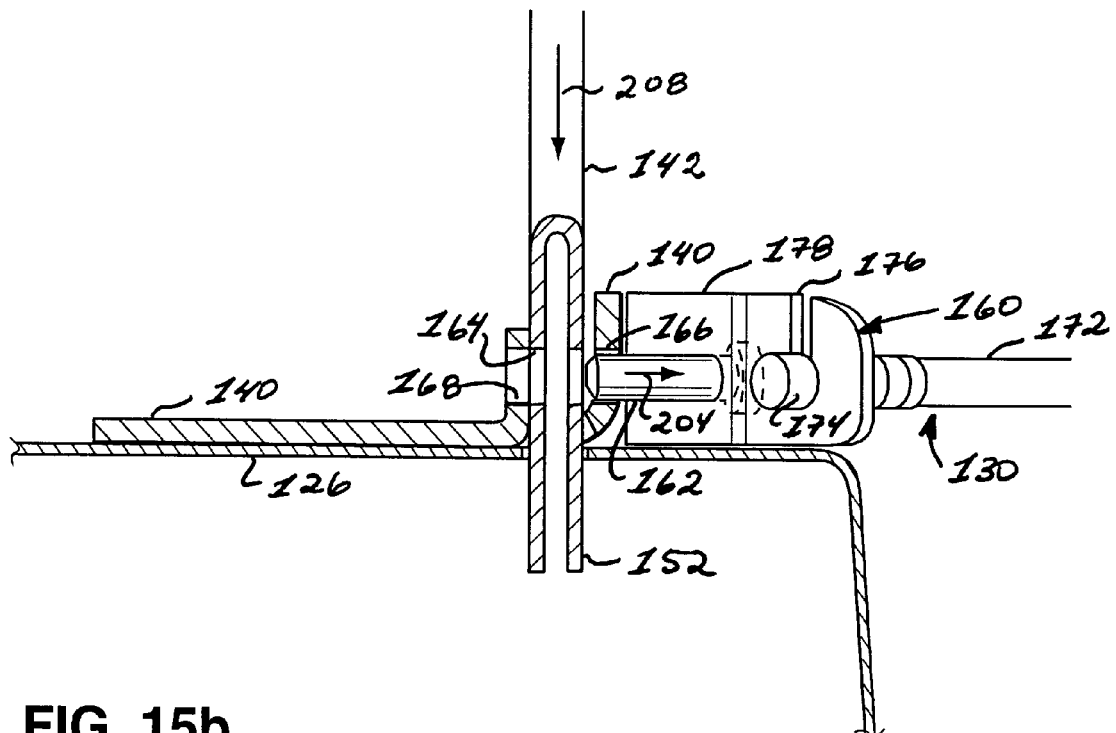
FIG. 15b is a similar view to FIG. 15a showing the locking pin being retracted from the prop.

A leaf spring 160 is mounted to the second hinge bracket 140 and carries a locking pin 162 which slidingly engages a passage defined by through hole 164 formed in the free end of the prop 142 (see FIGS. 15a, b) and respective apertures 166, 168 (FIG. 15b) formed in upturned flange portions of the second hinge bracket 140 on opposite sides of the prop 142, only one of which may be seen in the views of FIGS. 12 to 14.

The leaf spring 160 biases the locking pin 162 into engagement with the hole 164 and is retracted to withdraw the locking pin 162 by means of the cable retractor 130. The cable retractor 130 comprises a cable 170 generally covered along its length by a sheath 172 and drawn with an exposed end in FIG. 15a. The exposed extremity of the cable 170 has a swaged termination 174 of greater diameter than the cable 170 and the cable 170 is slidingly received in a slot 176 formed in a transverse bent portion 178 of the leaf spring 160. The orientation of the bent portion 178 is selected to maximize leverage of the cable 170 against the leaf spring 160. The cable 170 is secured at another end remote from the prop 142 to the hood latch assembly 132 which, as is common, is centrally disposed on the undersurface of the hood assembly 122.

The hood latch assembly 132 has an actuator 180 pivotally hinged to a latch bracket 182 about a pivot axis 184. The actuator 180 is positioned underneath the hood assembly 122 adjacent a marginal edge thereof so that it can readily be accessed through a small gap sufficient to allow entry of the fingers between the hood assembly 122 and the vehicle body 126. Release of the hood assembly 122 to create such a gap is normally initiated from within the vehicle by tensioning a cable (not shown) coupled to the hood latch assembly 132. The actuator 180 is coupled by a latch rod 186 to a spring biased lever 188 which engages a catch (not shown) disposed inside the engine compartment 124 of the vehicle 120. Depressing the actuator 180 with one's thumb as indicated by directional arrow 190 in FIG. 13 causes the actuator to rock on its pivot axis 184 and to raise the latch rod 186 as indicated by directional arrow 192 so that the lever 188 rocks on its pivot axis 194 to move from the ghost line position indicated in FIG. 13 downwardly as indicated by directional arrow 196, thereby raising a bearing plate 198 formed from the lever 188 and to which the cable 170 is secured as indicated by directional arrow 200. Raising the bearing plate 198 causes the cable 170 to be tensioned and to move the leaf spring 160 as indicated by directional arrow 202 thereby pulling the locking pin 162 out of engagement with the hole 164 as indicated by directional arrow 204.

When the actuator 180 is released as shown in FIG. 14, the hood assembly 122 may be released into a closed position as shown by directional arrow 206. Continued pivotal movement of the hood assembly 122 causes the prop 142 to move downwardly as indicated by directional arrow 208 into a cavity of the vehicle body and with the leaf spring biasing the associated locking pin 162 into engagement with the prop 142, the prop 142 being guided into said cavity between the upturned flanges formed from the second hinge bracket 140. It will be noted that the flanges which carry apertures 166, 168 (FIG. 15b) for receiving the locking pin 162 therethrough provided additional support for the locking pin 162 when it is engaged in the through hole 164 formed in the prop 142.

Conveniently, it will be appreciated that depression of the actuator 180 operates on both cable retractors 130 simultaneously thereby allowing a single operator to release both prop assemblies without further assistance.

It will be appreciated that several variations may be made to the above described embodiments of the invention within the scope of the appended claims as will be apparent to those skilled in the art. In particular, the nature of the hinge assemblies and hood latch assembly illustrated in the drawings are exemplary in nature and should not be construed as any limitation on the invention herein defined.

For example, the hood latch assembly could be mounted to the vehicle body behind the front grille and the cable retractor according to the invention would be laid inside the vehicle adjacent to the engine compartment. Such an alternative is illustrated by the ghost outline drawn in FIG. 11. The retainer for the coiled spring in the embodiment of FIGS. 1 to 10 could be in the form of a circlip instead of cotter pin. Further, it will be appreciated that the prop assembly of the invention may be associated with a closure panel other than a hood assembly for closing an opening in a vehicle body and could equally find application elsewhere.

What is claimed is:

1. A prop assembly for temporarily supporting a closure panel in an extended position removed from an opening, the closure panel and a body defining said opening being coupled by a closure hinge, the prop assembly having
   a rigid elongated prop having a hinged end for coupling to the closure panel and having a free end remote from said hinged end, movable during opening and closing of the opening, the free end having a passage,
   a locking pin adapted to be coupled to said body for sliding engagement into said passage,
   spring biasing means for urging the locking pin into engagement with the prop, and
   a retractor for withdrawing the locking pin away from the prop.

2. Prop assembly according to claim 1 in which said closure hinge has a first hinge bracket for coupling to the closure panel and a second hinge bracket for coupling to the body, the hinged end of the prop being adapted to be coupled to said first hinge bracket.

3. Prop assembly according to claim 2 in which the spring biasing means is in the form of a leaf spring for coupling to the second hinge bracket and the locking pin is mounted to the leaf spring.

4. Prop assembly according to claim 1 in which said passage is in the form of a through hole.

5. Prop assembly according to claim 1 in which the locking pin and retractor are defined by opposite ends of a rigid rod slidingly mountable to the body between a pair of spaced mounting flanges apertured to receive the rod therethrough, and the spring biasing means is in the form of a coiled spring slidingly disposed on said rod for location between one of said mounting flanges remote from the locking pin and a retainer coupled to the rod proximate to the locking pin.

6. Prop assembly according to claim 5 in which the retractor is a bent trailing end portion of the rod.

7. Prop assembly according to claim 5 in which the retainer is a cotter pin slidingly received in a receiving aperture formed in the rod.

8. Prop assembly according to claim 5 in which the rod has a detent cut into an outer surface of the rod adjacent said locking pin for latching engagement with the prop.

9. Prop assembly according to claim 1 in which the prop is comprised of a hollow body.

10. Prop assembly according to claim 9 in which the prop is tubular.

11. Prop assembly according to claim 9 in which the prop is formed by bending sheet metal into a U-shaped section.

12. Prop assembly according to claim 1 having visual indicator means showing the relative position of the locking pin to the prop and associated with the body, said visual indicator means having at least two adjacent zones of contrasting colour disposed proximate to said retractor.

13. Prop assembly according to claim 1 in which the body has an aperture for slidingly receiving said free end of the prop into a body cavity, the free end of the prop having a stop spaced from said passage for engaging the body when the hood assembly is in a maximum open position.

14. Prop assembly according to claim 1 in which the spring biasing means is in the form of a leaf spring for coupling to the body and the locking pin is mounted to the leaf spring.

15. Prop assembly according to claim 14 in which the retractor comprises a cable coupled to the leaf spring at one end and at another end remote from the leaf spring, to an actuator for tensioning the cable.

16. Prop assembly according to claim 15 in which the actuator is coupled to the closure panel and forms part of a latch assembly for latching the closure panel to the body.

17. Prop assembly according to claim 15 in which said passage is in the form of a through hole.

18. Prop assembly according to claim 15 in which the prop is comprised of a hollow body.

19. Prop assembly according to claim 18 in which the prop is tubular.

20. Prop assembly according to claim 18 in which the prop is formed by bending sheet metal into a U-shaped section.

21. Prop assembly according to claim 15 in which the body has an aperture for slidingly receiving said free end of the prop into a body cavity, the free end of the prop having a stop spaced from said passage for engaging the body when the hood assembly is in a maximum open position.

22. A pair of prop assemblies each made according to claim 15 for coupling to respective sides of a body opening and to said closure panel, each said cable being coupled to a common actuator.

23. A pair of prop assemblies according to claim 22 in which the actuator is coupled to the closure panel and forms part of a latch assembly for latching the closure panel to the body.

24. A prop assembly for temporarily supporting a closure panel in an extended position removed from an opening, the closure panel and a body defining said opening being coupled by a closure hinge, the prop assembly having a rigid elongated prop having a hinged end for coupling to the closure and having a free end remote from said hinged end, movable during opening and closing of the opening, the free end having a passage, a locking pin adapted to be coupled to said body for sliding engagement into said passage, spring biasing means for urging the locking pin into engagement with the prop, a retractor for withdrawing the locking pin away from the prop, the locking pin and retractor being defined by opposite ends of a rigid rod slidingly mountable to the body between a pair of spaced mounting flanges apertured to receive the rod therethrough, and the spring biasing means being in the form of a coiled spring slidingly disposed on said rod for location between one of said mounting flanges remote from the locking pin and a retainer coupled to the rod proximate to the locking pin.

25. Prop assembly according to claim 24 in which the retractor is a bent trailing end portion of the rod.

26. Prop assembly according to claim 24 in which the prop is comprised of a hollow body.

27. Prop assembly according to claim 24 in which the prop is tubular.

28. Prop assembly according to claim 24 in which the prop is formed by bending sheet metal into a U-shaped section.

29. A closure panel hinge and prop assembly for temporarily supporting a closure panel in an extended position removed from an opening, the closure panel hinge having a first hinge bracket for coupling to the closure panel and a second hinge bracket for coupling to a body defining said opening, the prop assembly having a rigid elongated prop hinged at one end to said first hinge bracket and having a free end remote from said hinged end, movable during opening and closing of the opening through respective cooperating apertures formed in said second hinge bracket and the body into a body cavity, the free end of the prop having a passage, the prop assembly further having a locking pin adapted to be coupled to said body for sliding engagement into said passage, spring biasing means for urging the locking pin into engagement with the prop, and a retractor for withdrawing the locking pin away from the prop.

30. Closure hinge and prop assembly according to claim 29 in which the locking pin and retractor are defined by opposite ends of a rigid rod slidingly mountable to the body between a pair of spaced mounting flanges apertured to receive the rod therethrough, and the spring biasing means is in the form of a coiled spring slidingly disposed on said rod for location between one of said mounting flanges remote from the locking pin and a retainer coupled to the rod proximate to the locking pin.

31. Closure hinge and prop assembly according to claim 30 in which said spaced mounting flanges form part of said second hinge bracket.

32. Closure panel hinge and prop assembly according to claim 29 in which the spring biasing means is in the form of a leaf spring coupled to the second hinge bracket and the locking pin is mounted to the leaf spring.

33. Closure panel hinge and prop assembly according to claim 32 in which the retractor comprises a cable coupled to the leaf spring at one end and at another end remote from the leaf spring, to an actuator for tensioning the cable.

34. A pair of closure panel hinge and prop assemblies each made according to claim 33 for coupling to respective sides of a body opening and to said closure panel, each said cable being coupled to a common actuator.

35. Prop assembly according to claim 33 in which the actuator is coupled to the closure panel and forms part of a latch assembly for latching the closure panel to the body.

36. Prop assembly for temporarily supporting a closure panel in an extended position removed from an opening, the closure panel and a body defining said opening being coupled by a closure hinge, the prop assembly having a rigid elongated prop having a hinged end for coupling to the closure and having a free end remote from sad hinged end, movable during opening and closing of the opening, the free end having a passage, a locking pin adapted to be coupled to said body for sliding engagement into said passage, spring biasing mean for urging the locking pin into engagement with the prop, a retractor for withdrawing the locking pin away from the prop, the locking pin and r tractor being defined by opposite ends of a rigid rod slidingly mountable to the body between a pair of spaced mounting flanges apertured to receive the rod therethrough, and the spring biasing means being in the form of a coiled spring slidingly disposed on said rod for location between one of said mounting flanges remote from the locking pin and a retainer comprising a cotter pin slidingly received in a receiving aperture formed in the rod proximate to the locking pin.

37. Prop assembly for temporarily supporting a closure panel in an extended position removed from an opening, the closure panel and a body defining said opening being coupled by a closure hinge, the prop assembly having a rigid elongated pro having a hinged end for coupling to the closure and having a free end remote from said hinged end, movable during opening and closing of the opening, the free end having a passage, a locking pin adapted to be coupled to said body for sliding engagement into said passage, spring biasing means for urging the locking pin into engagement with the prop, a retractor for withdrawing the locking pin away from the prop, the locking pin and retractor being defined by opposite ends of a rigid rod slidingly mountable to the body between a pair of spaced mounting flanges apertured to receive the rod therethrough, the rod having a detent cut into an outer surface of the rod adjacent said locking pin for latching engagement with the prop, and the spring biasing means being in the form of a coiled spring slidingly disposed on said rod for location between one of said mounting flanges remote from the locking pin and a retainer comprising is a cotter pin slidingly received in a receiving aperture formed in the rod proximate to the locking pin.

38. Prop assembly for temporarily supporting a closure panel in an extended position removed from an opening, the closure panel and a body defining said opening being coupled by a closure hinge, the prop assembly having a rigid elongated prop having a hinged end for coupling to the closure and having a free end remove from said hinged end, movable during opening and closing of the opening, the free end having a passage, a locking pin adapted to be coupled to said body for sliding engagement into said passage, spring biasing mean for urging the locking pin into engagement with the prop, a retractor for withdrawing the locking pin away from the prop, the locking pin and retractor being defined by opposite ends of a rigid rod slidingly mountable to the body between a pair of spaced mounting flanges apertured to receive the rod therethrough, and the spring biasing means being in the form of a coiled spring slidingly disposed on said rod for location between one of said mounting flanges remote from the locking pin and a retainer coupled to the rod proximate to the locking pin, and visual indicator means showing the relative position of the locking pin to the prop and associated with the body, said visual indicator means having at least two adjacent zones of contrasting colour disposed proximate to said retractor.

39. Prop assembly for temporarily supporting a closure panel in an extended position remove from an opening, the closure panel and a body defining said opening being coupled by a closure hinge, the body further having an aperture for slidingly receiving said free end of the prop into a body cavity, the prop assembly having a rigid elongated prop having a hinged end for coupling to the closure and having a free end remove from said hinged end, movable during opening and closing of the opening, the free end having a passage, and a stop spaced from said passage for engaging the body when the hood assembly is in a maximum open position, a locking pin adapted to be coupled to said body for sliding engagement into said passage, spring biasing mean for urging the locking pin away from the prop, the locking pin and retractor being defined by opposite ends of a rigid rod slidingly mountable to the body between a pair of spaced mounting flanges apertured to receive the rod therethrough, and the spring biasing means being in the form of a coiled spring slidingly disposed on said rod for location between one of said mounting flanges remote from the locking pin and a retainer coupled to the rod proximate to the locking pin.

* * * * *